Sept. 17, 1940. G. INNES Re. 21,571

PICK-UP MECHANISM

Original Filed Nov. 17, 1937 2 Sheets-Sheet 1

GEORGE INNES INVENTOR.

BY Merrill M. Blackburn.
ATTORNEY.

Sept. 17, 1940. G. INNES Re. 21,571

PICK-UP MECHANISM

Original Filed Nov. 17, 1937 2 Sheets-Sheet 2

GEORGE INNES INVENTOR.

BY Merrill M. Blackburn
ATTORNEY.

Reissued Sept. 17, 1940

Re. 21,571

UNITED STATES PATENT OFFICE 21,571

PICK-UP MECHANISM

George Innes, Davenport, Iowa, assignor to Innes Company, Bettendorf, Iowa, a corporation of Delaware Original No. 2,133,143, dated October 11, 1938, Serial No. 175,064, November 17, 1937. Application for reissue September 19, 1939, Serial No. 295,639

26 Claims. (Cl. 56—364)

The present invention relates to harvesting machinery and more particularly to pick-up mechanism for gathering vegetation which has been severed and left lying upon the ground. Of course this can be used with a cutter mechanism so that the cutting and gathering will both be performed as parts of the same operation.

It is found that in rice fields a pick-up with rigid fingers has a tendency to gather and convey over to the apron or conveyor belt stones and chunks of dirt. This is thoroughly undesirable and it is the primary purpose of this invention to overcome this objectionable feature of prior machines. Other objects of this invention are the provision of an improved rotary means for picking up the cut vegetation; the provision of improved means for rotating the pick-up unit; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention, and an alternative form thereof, I desire this disclosure to be understood as illustrative only and not to be interpreted in a limiting sense.

In the drawings annexed hereto and forming a part hereof.

Figure 1:
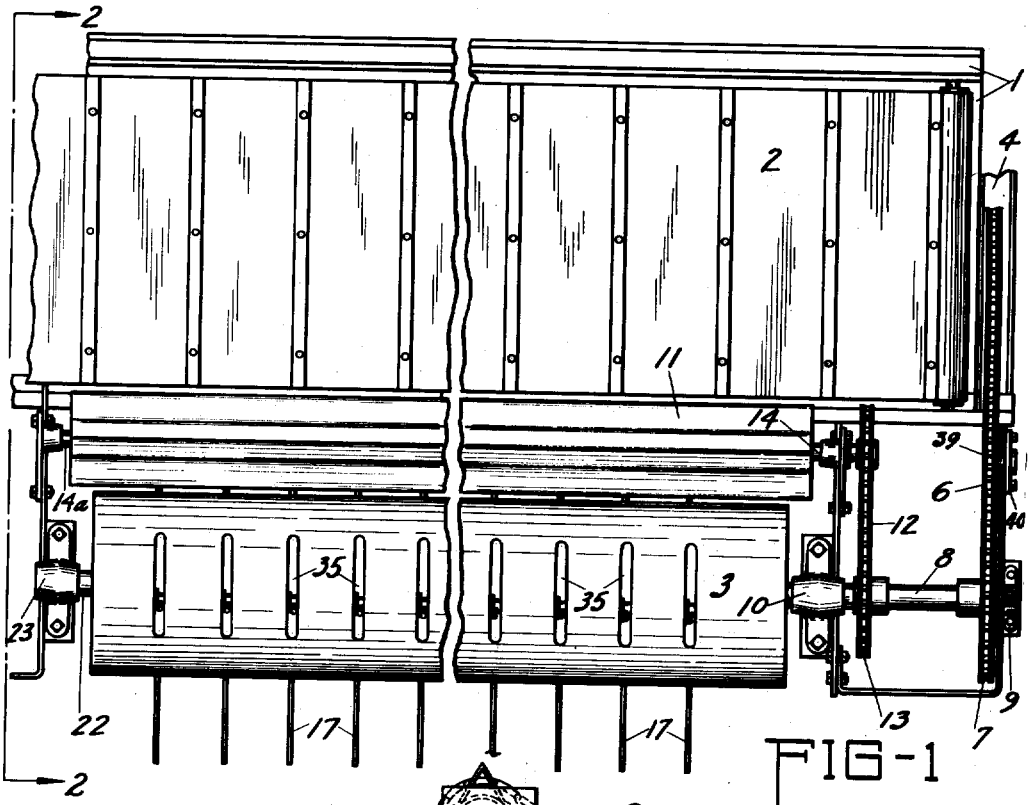
Fig. 1 represents a broken fragmentary view, in plan, of a construction embodying my present invention.
Figure 2:
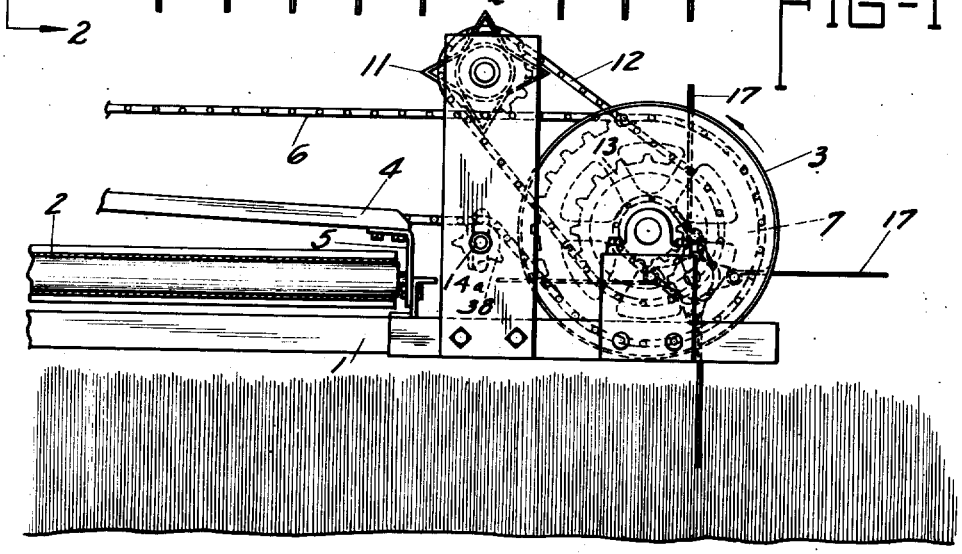
Fig. 2 represents a side elevation taken from the left side of Fig. 1, as indicated by the arrows 2—2.

Reference will now be made in greater detail to the annexed drawings for a more complete description of this invention. A frame 1 is supported on suitable carrying wheels, not shown, and has an apron or conveyor canvas 2, to which the grain is delivered after it has been picked up by the pick-up unit 3. At one end of the frame is a trough 4 supported on suitable brackets 5 attached to the frame. A driving chain 6 connects the source of power with a sprocket wheel 7 mounted on a driving shaft 8, which drive shaft is supported by suitable bearing elements 9 and 10. A device 11 for carrying the vegetation from the pick-up 3 to the apron 2 is rotated by a chain 12 running over a sprocket 13 on the shaft 8. This device 11, referred to herein as a slinger, is carried on a shaft 14 mounted in suitable bracekts adjacent the ends of the shaft.

Figure 5:
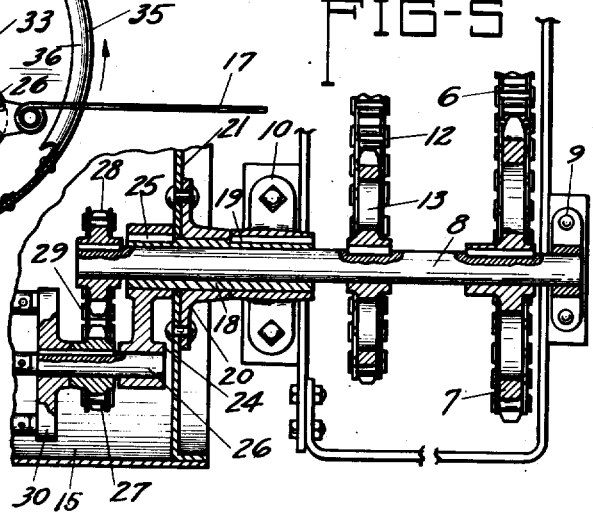
Fig. 5 is similar to the right hand portion of Fig. 3 and represents the preferred embodiment of this construction.

The pick-up unit 3 comprises a drum 15 and cage 16 having spring fingers 17, together with operating means for the cage. As shown in Fig. 5, the sprocket wheels 7 and 13, in the preferred form of this construction, are secured directly to the shaft 8. Therefore, when the chain 6 is driven from the source of power, the shaft 8 is rotated, driving the chain 12 and, through this, the slinger 11. A sleeve 18 surrounds the shaft 8 and is keyed, as shown at 19, to the bearing unit 10. If desired any suitable form of roller or ball bearing may be inserted between the sleeve 18 and the shaft 8. A collar 20 is rotatably mounted on the sleeve 18 and is secured to the end 21 of the drum 15. This furnishes a bearing for the drum on the sleeve. If desired, suitable bearing elements may be inserted between the collar 20 and sleeve 18, although this is regarded as unnecessary because the rate and amount of rotation between these two is comparatively slight. The opposite end of the drum is supported by a suitable shaft 22 and bearing 23.

A bracket or arm 24 is keyed to the sleeve 18 by a key 25 and it is therefore apparent that since the sleeve is held stationary by the key 19 the bracket or arm 24 will also be held stationary and at the proper angle, once it is properly set. This bracket 24 has a shaft 26 rotatably mounted therein and this shaft 26 cooperates with a like shaft at the opposite end of the cage 16 in supporting the latter in proper position within the drum 15. Sprockets 27 and 28 are respectively mounted on the shafts 26 and 8 and are located in the same plane, the sprockets being keyed to their respective shafts and connected by means of a chain 29. Therefore, rotation of the shaft 8 causes rotation of the shaft 26 and the cage 16, which is keyed to the shaft 26.

Figure 3:
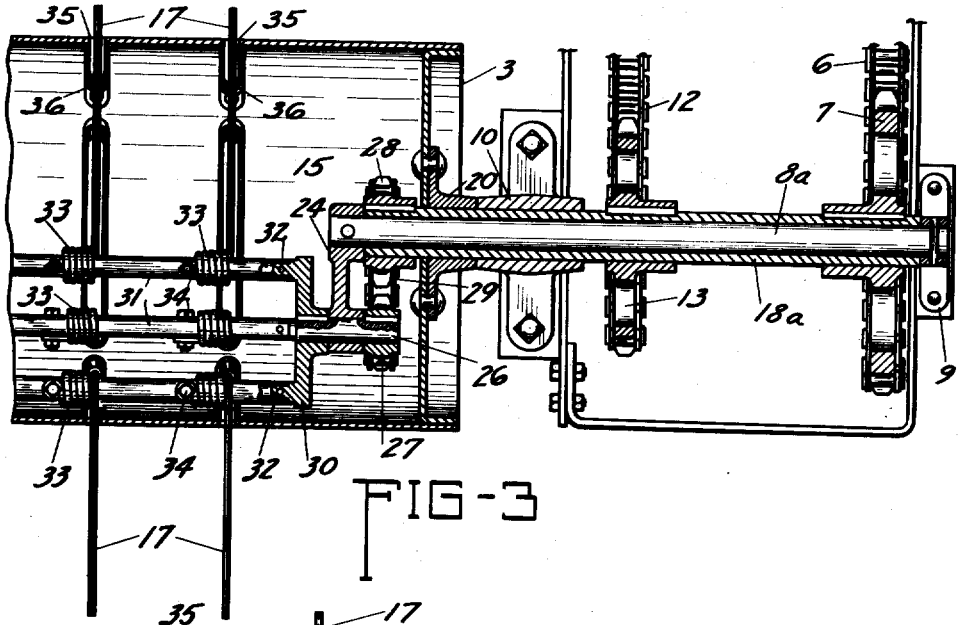
Fig. 3 represents a longitudinal section through the pick-up unit in the plane defined by the axis of the drum and the axis of the cage.
Figure 4:
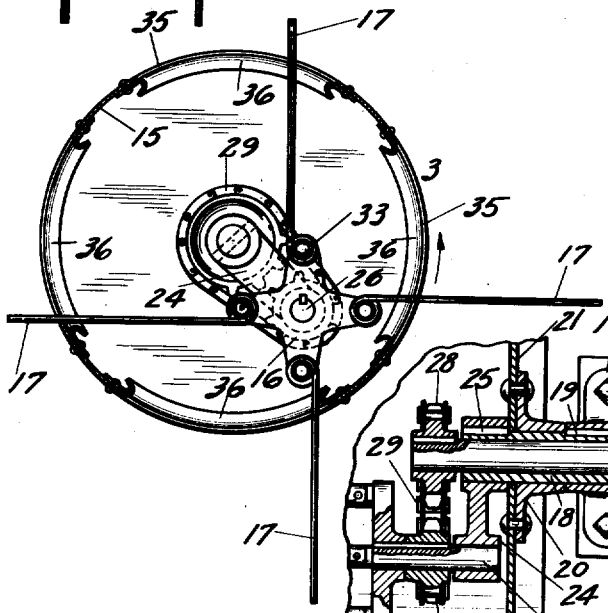
Fig. 4 represents a vertical transverse section through the pick-up unit.

The cage comprises a pair of ends 30 and a plurality of tubular bars 31, the ends of which surround lugs 32, projecting inwardly from and formed on the inner faces of the ends 30. These bars are pinned to the lugs 32 and are therefore incapable of rotation about them. The spring fingers 17 are formed at their inner ends into coils 33 which are rigidly secured to the bars 31 by means of bolts 34. Openings 35, formed in the peripheral wall of the drum 15, have reenforcements 36 surrounding them and secured to the inside of the drum wall. These not only reenforce the drum but furnish a smooth surface to be engaged by the fingers 17 which project through the openings, as shown clearly in Figs. 3 and 4.

It is apparent from the foregoing that the drum, being free to rotate, will be driven by the fingers of the cage as the latter rotates about its axis. It is also apparent that if the spring fingers strike obstructions, such as stones and clods of earth, they will yield and slide past them so that such materials will not be picked up with the rice or other vegetation which is being gathered. It is also apparent that the slinger 11 will receive the cut vegetation picked up by the pick-up 3 and throw it on the apron 2 to be delivered to that part of the mechanism to which this apron is to carry the grain.

A sprocket 38 is held adjustably by a nut and bolt 39 upon an upright 40 which is slotted for the reception of the bolt 39 and to permit vertical adjustment of the sprocket 38 so as to carry the chain above the trough 4 and also keep the chain adjusted to a proper tightness.

In the structure shown in Figs. 1 to 4, inclusive, a sleeve 18*a*, corresponding to sleeve 18 in Fig. 5, extends from the outer bearing 9 to a point inside of the drum. In this form, the shaft 8 is designated 8*a* because it differs slightly from the shaft shown in Fig. 5. It will be seen from Fig. 3 that the shaft 8*a* is secured to the bearing member 9 and therefore does not rotate therein. The bracket 24 is pinned to the opposite end of the shaft 8*a* and is therefore held in a rigid position because of the shaft being held rigidly. It is apparent from this figure that the sprocket 7 is keyed to the sleeve 18*a* instead of to the shaft, as in the previously described construction. Also, the sprocket 13 is keyed to the sleeve 18*a* which is free to rotate in the bearing member 10, under the influence of the chain 6 and sprocket 7. In this form of construction, the drum 15 is free to rotate on the sleeve 18*a*, just as in the previously described construction. In this construction, the sprocket 28 is keyed to the sleeve 18*a* instead of to the shaft, as in the structure previously described. The operation of this device is substantially the same as that shown in Fig. 5, the only difference being that in one the solid shaft rotates and causes rotation of the cage and drum while the sleeve or hollow shaft is held stationary and, in the other form, the functions of the two parts are reversed.

It is of course understood that the specific description set forth above may be departed from without departing from the spirit of this invention as set forth in this specification and the appended claims.

Having now described my invention, I claim:

1. In a pick-up for loose vegetable matter, in combination, a rotatable drum having peripheral apertures for the reception of spring fingers, a rotary cage within said drum, eccentrically positioned and having spring fingers mounted thereon and extending through said apertures, and driving means connected in driving relation with said cage to cause the fingers to rotate said drum.

2. A pick-up of the character indicated comprising a hollow drum having apertured ends and a substantially cylindrical wall, supporting means for the drum extending through substantially central apertures in said ends, openings in said wall, an eccentrically positioned cage extending longitudinally of said drum and supported for rotation therein about an axis substantially parallel to the axis of the drum, said cage having longitudinally extending finger supports, spring fingers yieldably but non-rotatably mounted on said finger supports and extending through the wall openings, said fingers, when the cage is rotated, engaging said wall and causing rotation of said drum, and driving means for said cage.

3. A pick-up for the purpose indicated comprising a drum mounted for rotation upon a substantially horizontal axis, a cage within the drum having an axis substantially parallel with the axis of the drum and eccentrically positioned with respect thereto, said cage comprising end members and finger supporting bars connecting the end members, spring fingers fixedly connected with said bars and loosely with said drum and actuated by rotation of said cage to cause rotation of said drum, and a rotary shaft by which the drum is supported and through which power is transmitted to cause rotation of the cage and the drum.

4. A pick-up comprising bearing supporting means, a bearing element supported thereby, a shaft supported by the bearing element and extending therethrough, a rotary drum, one end of which is supported by the bearing element, a support for the second end of the drum, a rotary cage eccentrically positioned within the drum with its axis held in a substantially fixed position with relation to the axis of the drum, spring fingers carried by the cage and extending through openings in the wall of the drum, said cage having an axle about which it rotates, and driving means for rotating said cage, said spring fingers, when the cage is rotated about its axis, engaging the edges of the openings in the wall of the drum and causing the drum to rotate.

5. In a pick-up, a power shaft, bearings to support said shaft, a sleeve surrounding said shaft and fixedly secured in one of said bearings, a drum rotatable about said sleeve, a bracket within said drum and fixedly mounted on said sleeve, a shaft rotatably mounted in said bracket, a cage carried by the second shaft and rotatable therewith, means connecting said shafts to cause the second shaft to be rotated by the first shaft, and spring fingers carried by said cage and extending through openings in the wall of said drum, said spring fingers transmitting power to the drum when the cage is rotated and thus causing rotation of the drum.

6. A pick-up comprising a power shaft, a drum connected to said shaft and freely rotatable with respect thereto, an axle within said drum and extending longitudinally thereof, driving means for rotating said axle, a cage fixedly connected to said axle for rotation therewith, and spring fingers projecting from said cage and rotating therewith, said spring fingers extending through the wall of said drum and causing rotation thereof when the cage shaft is rotated.

7. A pick-up comprising a fixed shaft, a sleeve surrounding said shaft and rotatable about same as an axle, driving means for rotating said sleeve, a drum having one end supported by the sleeve and freely rotatable thereon, an arm rigidly mounted on said shaft and held in a fixed position thereby, a shaft rotatably mounted in said arm, eccentrically with relation to the fixed shaft, a cage carried by the second shaft and rotating therewith, and spring fingers rigidly secured to the cage and rotating therewith, said spring fingers being connected to said drum to rotate same about the sleeve.

8. In a pick-up for loose vegetable matter, in combination, a rotatable drum having peripheral apertures, a rotary device within said drum and comprising fingers which protrude through said apertures, said device being eccentrically positioned with respect to said drum, and driving means for said rotary device to cause rotation thereof and thereby cause rotation of said drum by engagement of said fingers with the ends of said apertures.

9. A rotary pick-up device comprising in combination, a cylindrical drum having a plurality of peripherally extending slots disposed therein, means for supporting said drum for rotation about its longitudinal axis, a rotor disposed within said drum, means for supporting said rotor for rotation about an axis substantially parallel to but offset from said drum axis; a plurality of resilient tines mounted on said rotor and extending through said slots, respectively, said tines being adapted to engage severed vegetation for moving the latter but being adapted to yield when they encounter an obstruction by moving along said slot relative to said drum, and means for rotating said drum and said rotor at the same speed of rotation.

10. In a rotary pick-up device of the class described including a rotatable drum having apertures therein, a rotor spindle supported rotatably within said drum substantially parallel to the axis of rotation of the drum and offset therefrom, a plurality of tine supporting rods carried by said spindle and disposed substantially parallel thereto, and tines mounted on said rods and extending outwardly through said apertures.

11. A rotary pick-up device of the class described including a rotatable drum having apertures therein, a rotor supported within said drum for rotation about an axis spaced from the axis of said drum, said rotor comprising a plurality of parallel rods, and tines mounted on said rods and extending through said apertures.

12. A rotary pick-up device comprising in combination, an elongated hollow drum having a plurality of peripherally extending slots disposed therein, means for supporting said drum for rotation about its longitudinal axis, a rotor disposed within said drum, means for supporting said rotor for rotation about an axis substantially parallel to but offset from said drum axis; a plurality of tines mounted on said rotor and extending through said slots, respectively, said tines being adapted to engage severed vegetation for moving the latter but being adapted to yield when they encounter an obstruction by moving along said slot relative to said drum, and means for rotating said device, said last named means being adapted to normally maintain said tines in the leading portions of said slots when the tines are in engagement with material on the ground, to provide for said yielding movement.

13. A rotary pick-up device comprising in combination, a cylindrical drum having a plurality of perforations disposed therein, bearing means at opposite ends thereof for rotatably supporting said drum, a rotor disposed within said drum and carrying a plurality of tines extending outwardly through said perforations in the drum, a shaft extending coaxially through said bearing means but restrained against rotation with the drum, means for supporting said rotor on said shaft for rotation within said drum on an axis spaced from the axis of rotation of said drum, a rotatable sprocket supported within said drum and coaxial with said shaft, a second sprocket connected to said rotor for rotation therewith, an endless chain interconnecting said sprockets, and means for driving said sprockets to rotate said rotor.

14. A device of the class described comprising in combination, a hollow drum having a plurality of perforations therein, a rotor disposed within said drum and carrying a plurality of tines extending outwardly through said perforations in the drum, a pair of concentric shafts disposed one within the other and extending into one end of and coaxial to said drum, means supporting said drum on one of said shafts and providing for rotation of said drum about the axis of said concentric shafts, a supporting frame for said device, bearing means on said frame in which one of said shafts is journaled, means for non-rotatably supporting the other of said shafts on said frame, bearing means disposed within said drum on which said rotor is journaled, bracket means fixed to said non-rotatably mounted shaft for supporting said rotor bearing means in offset relation to said concentric shafts, a pair of wheels mounted on said rotatably mounted shaft and on said rotor, respectively, power transmitting means interconnecting said pair of wheels, and means for driving said last named shaft.

15. In a rotary pick-up device of the class described, the combination of a rotatable drum having perforations through its cylindrical surface, a rotor disposed within said drum the axis of rotation of which is parallel to and eccentric with that of the drum, means for rotating said rotor and said drum, said means including a revoluble member disposed within said drum concentric with the axis of rotation thereof and operatively connected with said rotor, and tines carried on said rotor and adapted to project through said perforations.

16. In a rotary pick-up device of the class described the combination of a rotatable drum having perforations through its cylindrical surface, a pair of bracket members non-rotatably supported within said drum near opposite ends thereof, a rotor journaled in said bracket members offset from and parallel to the axis of rotation of said drum, means for rotating said rotor and said drum, said means including a revoluble member disposed within said drum concentric with the axis of rotation thereof and connected with said rotor, and tines carried on said rotor and adapted to project through said perforations.

17. In a rotary pick-up device of the class described, the combination of a rotatable drum having perforations through its cylindrical surface, a pair of bracket members non-rotatably supported within said drum near opposite ends thereof, a rotor journaled in said bracket members offset from and parallel to the axis of rotation of said drum, means for rotating said rotor and said drum, said means including a wheel disposed within said drum concentric with the axis of rotation thereof and connected with the drum to rotate therewith, a wheel connected with said rotor in radial alignment with said first mentioned wheel, flexible power transmitting means connecting said wheels, and tines carried on said rotor and adapted to project through said perforations.

18. A rotary pick-up device comprising, in combination, a cylindrical drum having a plurality of peripherally extending slots disposed therein, means for supporting said drum for rotation about its longitudinal axis, a rotor disposed within said drum, means for supporting said rotor for rotation about an axis substantially parallel to but offset from said drum axis, a plurality of resilient tines mounted on said rotor and extending through said slots, respectively, said tines being adapted to engage severed vegetation for moving the latter but being adapted to yield when they encounter an obstruction by moving along said slots relative to said drum, and means for actuating the pick-up.

19. In a rotary pick-up device of the class described, including a rotatable drum having apertures therein, a rotor supporting spindle supported rotatably within said drum substantially parallel to the axis of rotation of the drum and offset therefrom, a plurality of tine-supporting members carried by said rotor-supporting spindle and disposed substantially parallel thereto, and tines mounted on said members and extending outwardly through said apertures.

20. In a rotary pick-up device of the class described, including a rotatable drum having apertures therein, rotor-supporting means supported rotatably within said drum substantially parallel to the axis of rotation of the drum and offset therefrom, tine-supporting means carried by said rotor-supporting means and disposed substantially parallel thereto, and tines mounted on said tine-supporting means and extending outwardly through said apertures.

21. A rotary pick-up device of the class described, including a rotatable drum having apertures therein, a rotor suported within said drum for rotation about an axis spaced from the axis of said drum, said rotor comprising a plurality of parallel tine-supporting members, and tines mounted on said members and extending through said apertures.

22. In a rotary pick-up of the class described, the combination of a cylindrical drum having circumferentially extending slots in its peripheral surface, means for supporting said drum for rotation about its longitudinal axis, a rotor disposed within said drum, means for suporting said rotor for rotation about an axis substantially parallel to but offset from said drum axis, means for rotating said rotor, and a plurality of tines mounted on said rotor and projecting outwardly through said slots, said tines being adapted to yield by moving along the length of said slots.

23. A rotary pick-up device comprising, in combination, an elongated hollow drum having a plurality of peripherally extending slots disposed therein, means for supporting said drum for rotation about its longitudinal axis, a rotor disposed within said drum, means for suporting said rotor for rotation about an axis substantially parallel to but offset from said drum axis, a plurality of tines mounted on said rotor spaced angularly with relation to each other about the axis of the rotor and extending through said slots, respectively, said tines being adapted to engage severed vegetation for moving the latter but being adapted to yield when they encounter an obstruction by moving along said slots relative to said drum, and means for rotating said device.

24. A rotary pick-up device comprising, in combination, a cylindrical drum having a plurality of perforations disposed therein, bearing means at opposite ends thereof for rotatably supporting said drum, a rotor disposed within said drum and carrying a plurality of tines extending outwardly through said perforations in the drum, drum-supporting means mounted coaxially in said bearing means but restrained against rotation with the drum, means for supporting said rotor on said drum-supporting means for rotation within said drum on an axis spaced from the axis of rotation of said drum, a rotatable sprocket supported within said drum and coaxial with said drum-supporting means, a second sprocket connected to said rotor for rotation therewith, an endless chain interconnecting said sprockets, and means for driving said sprockets to rotate said rotor.

25. In a pick-up for loose vegetable matter, in combination, a rotatable drum having peripheral apertures for the reception of fingers, a rotary member within said drum, eccentrically positioned and having fingers mounted thereon and extending through the apertures, spring means connected with said fingers to normally hold them in a forward position, and driving means connected in driving relation with said member to cause rotation thereof.

26. In a rotary pick-up device of the class described, including a rotatable drum having apertures therein, a shaft rotatably supported within said drum substantially parallel to the axis of rotation of the drum and offset therefrom, and tines supported by said shaft, spaced symmetrically around the axis thereof and extending outwardly through said apertures.

GEORGE INNES.